United States Patent
Jaradi et al.

(10) Patent No.: US 12,077,119 B1
(45) Date of Patent: Sep. 3, 2024

(54) MOVEABLE NET ENGAGED WITH EXTENDABLE VEHICLE POST

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/489,941

(22) Filed: Oct. 19, 2023

(51) Int. Cl.
| | | |
|---|---|---|
| *B60R 21/08* | (2006.01) | |
| *B60R 21/01* | (2006.01) | |
| *B60R 21/013* | (2006.01) | |
| *B60R 21/02* | (2006.01) | |
| *B60R 21/20* | (2011.01) | |

(52) U.S. Cl.
CPC ............ *B60R 21/08* (2013.01); *B60R 21/013* (2013.01); *B60R 21/20* (2013.01); *B60R 2021/01211* (2013.01); *B60R 2021/01252* (2013.01); *B60R 2021/0273* (2013.01)

(58) Field of Classification Search
CPC ....... B60R 21/08; B60R 21/20; B60R 21/013; B60R 2021/0273; B60R 2021/01211; B60R 2021/01252
See application file for complete search history.

(56) References Cited

U.S. PATENT DOCUMENTS

| | | | |
|---|---|---|---|
| 7,125,069 B2 * | 10/2006 | Cacucci ................. | B60R 21/02 280/730.2 |
| 7,464,962 B2 * | 12/2008 | Hakansson ............. | B60R 21/08 280/749 |
| 8,573,634 B2 | 11/2013 | Choi et al. | |
| 10,682,972 B2 * | 6/2020 | Faruque ................. | B60R 21/08 |
| 10,696,187 B2 | 6/2020 | Lalague | |
| 10,717,358 B2 | 7/2020 | Patil | |
| 11,059,448 B2 | 7/2021 | Rutelin et al. | |
| 11,267,431 B2 | 3/2022 | Sekizuka | |
| 11,332,094 B2 * | 5/2022 | Farooq ................. | B60R 21/213 |
| 11,491,948 B2 | 11/2022 | Jaradi et al. | |
| 11,648,908 B2 | 5/2023 | Sung et al. | |
| 11,970,126 B2 * | 4/2024 | Jaradi ................... | B60J 5/0486 |
| 2002/0190513 A1 * | 12/2002 | Svetlik ................... | B60R 21/06 280/749 |
| 2022/0063520 A1 | 3/2022 | Ohno et al. | |

FOREIGN PATENT DOCUMENTS

| | | | | |
|---|---|---|---|---|
| DE | 102014017331 A1 * | 6/2015 | ............ | B60R 21/08 |
| DE | 102020209765 A1 * | 2/2022 | | |
| KR | 100250527 B1 * | 12/1996 | | |

* cited by examiner

Primary Examiner — Faye M Fleming
(74) Attorney, Agent, or Firm — Frank A. MacKenzie; Bejin Bieneman PLC

(57) ABSTRACT

A vehicle includes a vehicle floor and a post is extendable relative to the vehicle floor from a retracted position to an extended position. A net is moveably engaged with the post and the net is moveable relative to the post between a lowered position and a raised position. An airbag is supported on the post and is inflatable to an inflated position when the post is in the extended position and the net is in the raised position.

19 Claims, 10 Drawing Sheets

MOVEABLE NET ENGAGED WITH EXTENDABLE VEHICLE POST

BACKGROUND

Vehicles are equipped with airbags. In the event of certain vehicle impacts, an inflator activates and provides inflation medium to the airbags, and the airbags pressurize and act as supplemental restraints for occupants during the certain vehicle impacts. The airbags are located at various fixed positions in passenger compartments of vehicles. Vehicles may typically include a driver airbag mounted in the steering wheel, a passenger airbag mounted in a dashboard in a vehicle-forward direction from the front passenger seat, and side air curtains mounted in the roof rails.

DETAILED DESCRIPTION

Figure 1:
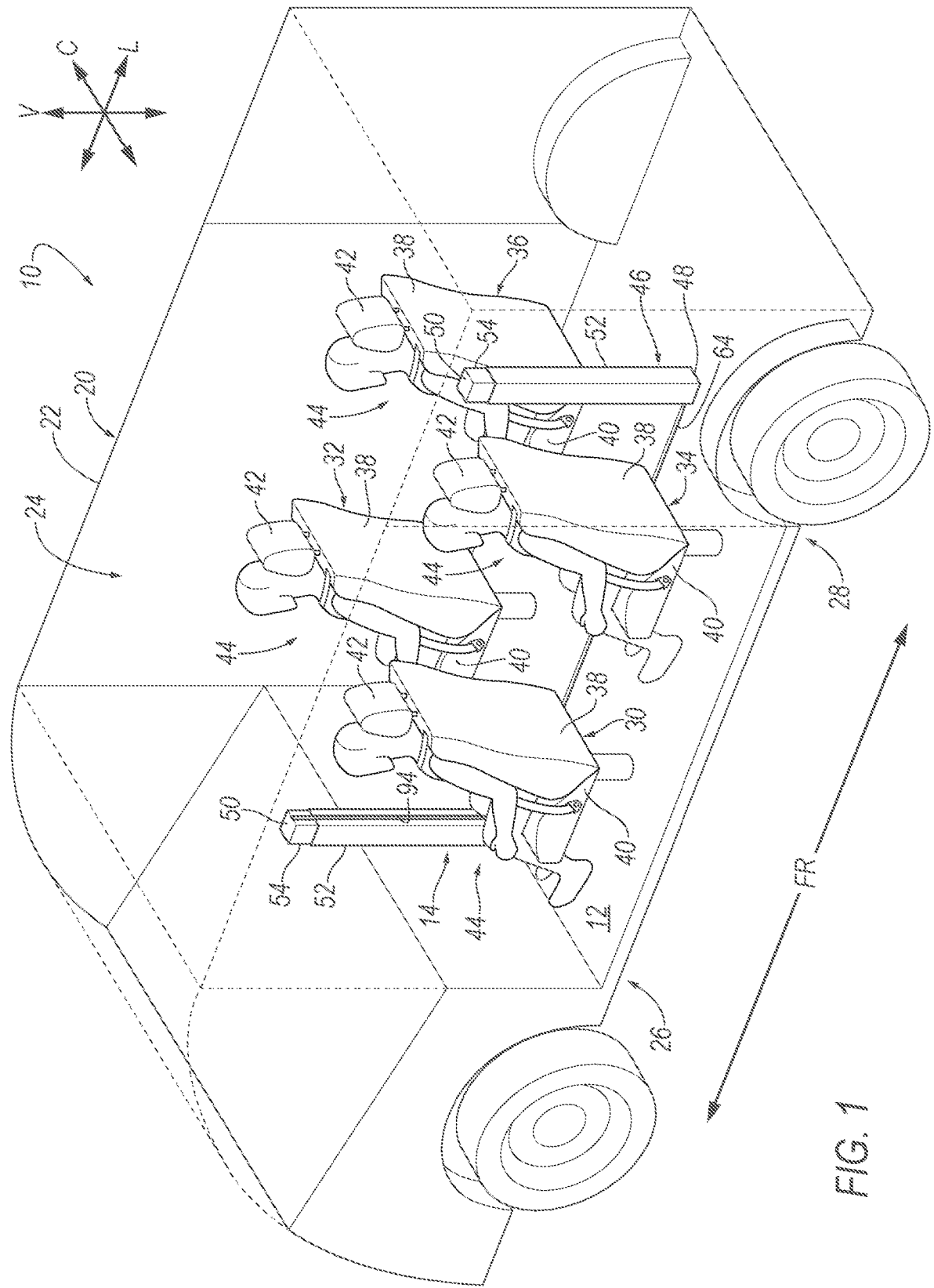
FIG. 1 is a perspective view of a vehicle.

A vehicle includes a vehicle floor and a post is extendable relative to the vehicle floor from a retracted position to an extended position. A net is moveably engaged with the post and the net is moveable relative to the post between a lowered position and a raised position. An airbag is supported on the post and is inflatable to an inflated position when the post is in the extended position and the net is in the raised position.

The vehicle may include a computer including a processor and a memory storing instructions executable by the processor to identify the vehicle is powered ON, based on identification that the vehicle is powered ON, extend the post from the retracted position to the extended position, and move the net from the lowered position to the raised position.

The instructions may include instructions to identify the vehicle is powered OFF, based on identification that the vehicle is powered OFF, move the net from the raised position to the lowered position, and retract the post from the extended position to the retracted position.

The instructions may include instructions to detect certain vehicle impacts and inflate the airbag to the inflated position.

The post may include a base and a member moveable relative to the base as the post moves to the extended position.

The airbag may be supported by the member of the post.

The post may be elongated along an axis. The member of the post may be moveable relative to the base along the axis.

The net may be spaced upwardly from the vehicle floor when the net is in the raised position and the post is in the extended position.

The vehicle may include a first seat and a second seat spaced cross-vehicle from the first seat. The net may be between the first seat and the second seat.

The airbag may be between the first seat and the net when the airbag is in the inflated position and the airbag is between the second seat and the net when the airbag is in the inflated position.

The airbag may include a pair of side portions spaced from each other and a top portion between the side portions. The net may be between the side portions in the inflated position.

The airbag may inflate away from the post to an end spaced from the post in the inflated position.

The vehicle may include a second post being extendable relative to the vehicle floor from a retracted position to an extended position. The second post may be spaced along a vehicle-longitudinal axis from the post. The vehicle may include a second airbag supported on the second post and being inflatable to an inflated position when the second post is in the extended position and the net is in the raised position. The net may be moveably engaged with the second post. The net may be moveable relative to the second post between the lowered position and the raised position.

The airbag may inflate in a vehicle-rearward direction and the second airbag inflates in a vehicle-forward direction.

The vehicle floor may define a slot extending from the post to the second post. The net may be in the slot when the net is in the lowered position.

The net may be spaced from the slot when the net is in the raised position.

The vehicle may include a first seat and a second seat spaced along the vehicle-longitudinal axis from the first seat. The airbag may be between the net and the first seat in the inflated position and the second airbag being between the net and the second seat in the inflated position.

The net may include a top edge and a bottom edge spaced along the post from the top edge. The airbag may extend from the top edge toward the bottom edge.

The vehicle may include a motor supported by the post and operatively coupled to the net to move the net from the lowered position to the raised position.

With reference to the Figures, wherein like numerals indicate like parts throughout the several views, a vehicle 10 includes a vehicle floor 12 and a post 14, hereinafter referred to as the "first post 14," is extendable relative to the vehicle floor 12 from a retracted position to an extended position. A net 16 is moveably engaged with the first post 14 and the net 16 is moveable relative to the first post 14 between a lowered position and a raised position. An airbag 18, hereinafter referred to as the "first airbag 18," is supported on the first post 14 and is inflatable to an inflated position when the first post 14 is in the extended position and the net 16 is in the raised position.

The first post 14 is in the retracted position and the net 16 is in the lowered position to allow occupants to ingress and egress the vehicle 10. After occupants have entered the vehicle 10, the first post 14 may move to the extended position and the net 16 is moveable along the first post 14 to the raised position. The net 16 is moveable along the first post 14 to move to the raised position between occupants of the vehicle 10. The first airbag 18 inflates in the event of certain vehicle impacts. The net 16 is a reaction surface for the first airbag 18 as the first airbag 18 controls the kinematics of occupants of the vehicle 10.

Figure 3:
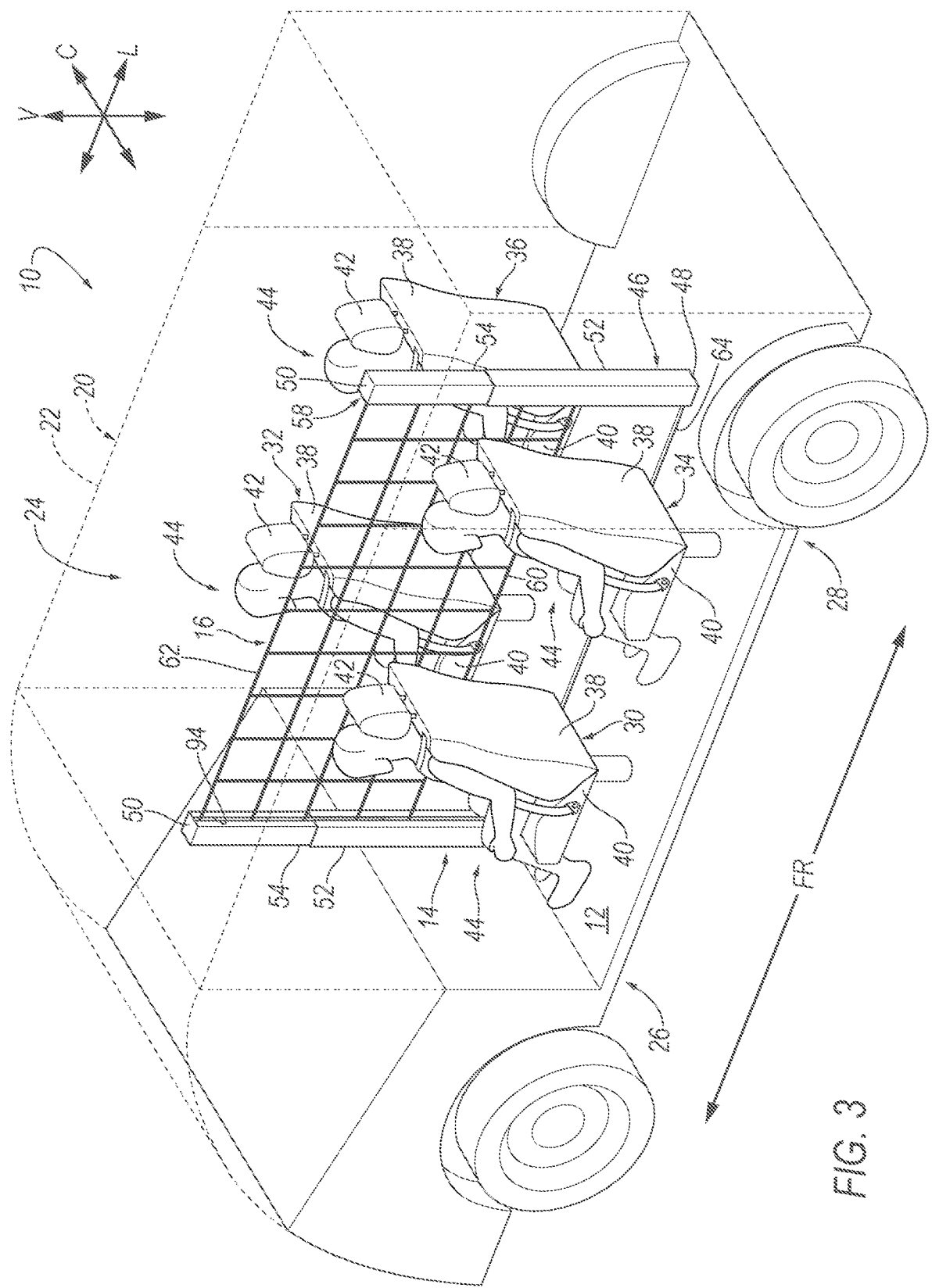
FIG. 3 is a perspective view of the vehicle with a net in the raised position.
Figure 5:
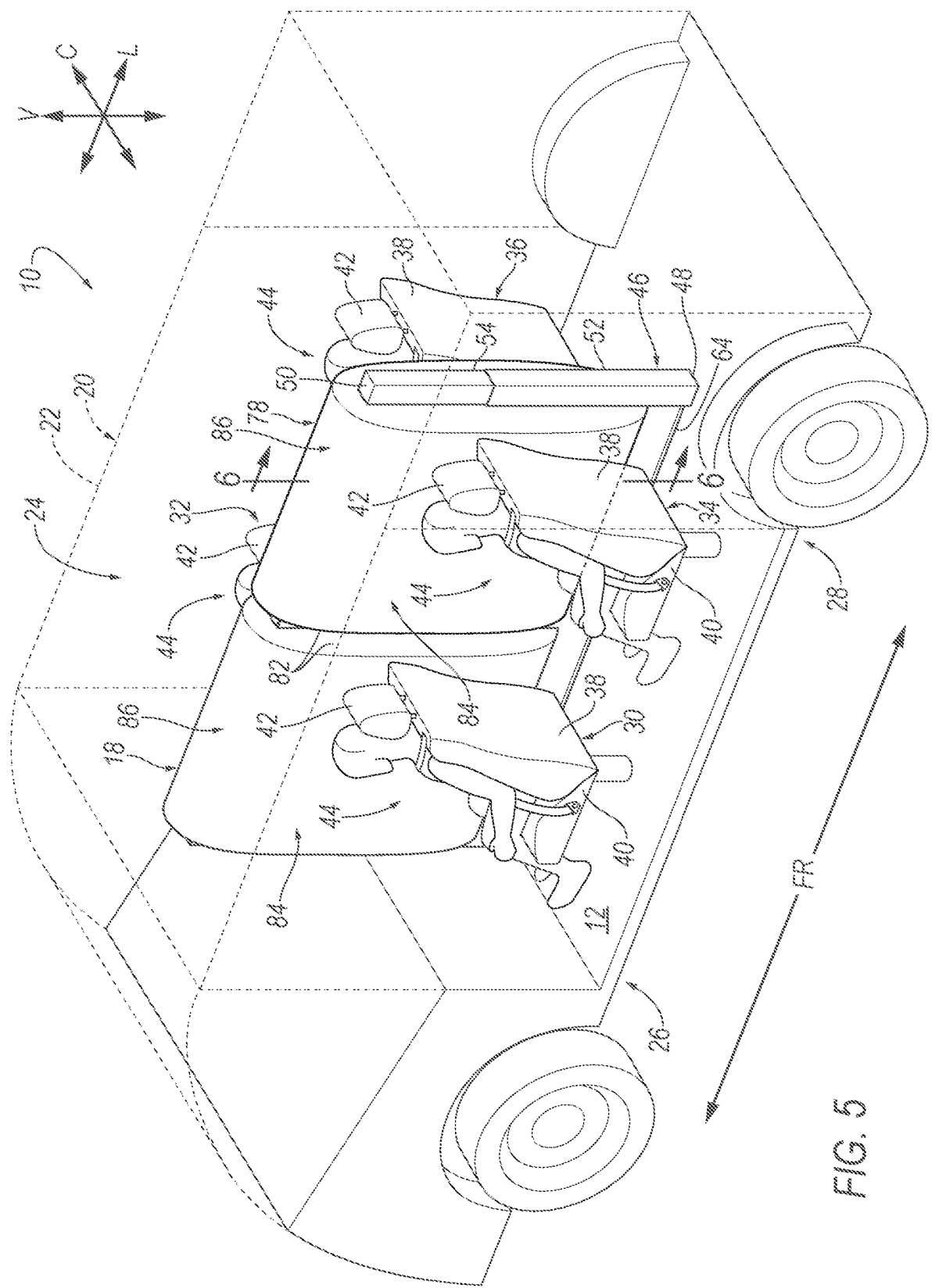
FIG. 5 is a perspective view of the vehicle with airbags in inflated positions.

With reference to FIGS. 1, 3, and 5, the vehicle 10 may be any suitable type of ground vehicle 10, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 10 defines a vehicle-longitudinal axis L extending between a front vehicle end (not numbered) and a rear vehicle end (not numbered) of the vehicle 10. The vehicle 10 defines a cross-vehicle axis C extending cross-vehicle from one side to the other side of the vehicle 10. The vehicle 10 defines a vertical axis V. The vehicle-longitudinal axis L, the cross-vehicle axis C, and the vertical axis V are perpendicular relative to each other.

The vehicle 10 includes a vehicle body 20 including rockers (not numbered), roof rails (not numbered), roof beams (not shown), pillars (not numbered), body panels (not numbered), vehicle floor 12, vehicle roof 22, etc. The vehicle 10 includes a passenger compartment 24 to house occupants of the vehicle 10. The passenger compartment 24 may extend across the vehicle 10, i.e., from one side to the other side of the vehicle 10. The passenger compartment 24 includes a front end 26 and a rear end 28 with the front end 26 being in front of the rear end 28 during forward movement of the vehicle 10.

The vehicle roof 22 and the vehicle floor 12 are spaced from each other. Specifically, the vehicle floor 12 is spaced downwardly from the vehicle roof 22. The vehicle roof 22 defines the upper boundary of the passenger compartment 24 and may extend from the front end 26 of the passenger compartment 24 to the rear end 28 of the passenger compartment 24. The vehicle roof 22 may include a roof panel (not numbered) extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

The vehicle 10 includes the vehicle floor 12 defining the lower boundary of the passenger compartment 24 and may extend from the front end 26 of the passenger compartment 24 to the rear end 28 of the passenger compartment 24. The vehicle floor 12 may include upholstery, for example, carpet, and may have a class-A surface facing the passenger compartment 24, i.e., a surface specifically manufactured to have a high quality, finished, aesthetic appearance free of blemishes.

With continued reference to FIGS. 1, 3, and 5, the vehicle 10 may include one or more vehicle seats 30, 32, 34, 36, hereinafter referred to as the "seats 30, 32, 34, 36." Specifically, the vehicle 10 may include any suitable number of seats 30, 32, 34, 36. The seats 30, 32, 34, 36 are supported by the vehicle floor 12. In other words, the vehicle floor 12 bears the weight of the seats 30, 32, 34, 36. The seats 30, 32, 34, 36 may be arranged in any suitable arrangement in the passenger compartment 24 and the vehicle 10 may include any suitable number of seats 30, 32, 34, 36. For example, one or more of the seats 30, 32, 34, 36 may be at the front end 26 of the passenger compartment 24, e.g., a driver seat and/or a passenger seat, and one or more of the seats 30, 32, 34, 36 may be behind the front end 26 of the passenger compartment 24, e.g., at the rear end 28 of the passenger compartment 24. In the example shown in the Figures, the vehicle 10 includes four seats 30, 32, 34, 36 in two rows with two seats 30, 32, 34, 36 in each row. Specifically, the vehicle 10 includes a first seat 30, a second seat 32, a third seat 34, and a fourth seat 36. A first row of seats includes two seats 30, 32, e.g., the first seat 30 and the second seat 32, spaced cross-vehicle from each other, e.g., spaced along the cross-vehicle axis C from each other, and a second row includes two seats 34, 36, e.g., the third seat 34 and the fourth seat 36, spaced cross-vehicle from each other, e.g., spaced along the cross-vehicle axis C from each other. The first row of seats 30, 32 are spaced longitudinally from the second row of seats 34, 36, e.g., along the vehicle-longitudinal axis L. In other words, the first seat 30 and the second seat 32 are each spaced along the vehicle-longitudinal axis L from the third seat 34 and the fourth seat 36. The seats 30, 32, 34, 36 may be movable relative to the vehicle floor 12 to various positions, e.g., movable fore-and-aft and/or cross-vehicle. The seat may be of any suitable type, e.g., a bucket seat.

Each of the seats 30, 32, 34, 36 includes a seatback 38, a seat bottom 40, and a head restraint 42. The head restraint 42 may be supported by and extending upwardly from the seatback 38. Specifically, the seatback 38 bears the weight of the head restraint 42. The head restraint 42 may be stationary or movable relative to the seatback 38. The seatback 38 may be supported by the seat bottom 40 and may be stationary or movable relative to the seat bottom 40. Specifically, the seat bottom 40 bears the weight of the seatback 38. The seatback 38, the seat bottom 40, and the head restraint 42 may be adjustable in multiple degrees of freedom. Specifically, the seatback 38, the seat bottom 40, and the head restraint 42 may themselves be adjustable. In other words, adjustable components within the seatback 38, the seat bottom 40, and the head restraint 42 may be adjustable relative to each other.

The seatback 38 and the seat bottom 40 of each of the seats 30, 32, 34, 36 define an occupant-seating area 44 of the seat. The occupant-seating area 44 is the area occupied by an occupant when properly seated on the seat bottom 40 and the seatback 38. The occupant-seating area 44 is in a seat-forward direction of the seatback 38 and above the seat bottom 40.

With reference to FIGS. 2A, 2B, 4A, and 4B, the vehicle 10 includes a one or more posts 14, 46 supported by the vehicle floor 12. In other words, the vehicle floor 12 bears the weight of the posts 14, 46. In the example shown in the Figures, the vehicle 10 includes the first post 14 and a second post 46. Each of the first post 14 and the second post 46 are fixed relative to the vehicle floor 12. In other words, the first post 14 and the second post 46 do not move along the vehicle floor 12 in any direction. The first post 14 and the second post 46 are spaced from each other longitudinally in the passenger compartment 24. In other words, the first post 14 is spaced from the second post 46 along the vehicle-longitudinal axis L. The first post 14 may be disposed at the front end 26 of the passenger compartment 24 and the second post 46 may be disposed at the rear end 28 of the passenger compartment 24.

Each of the first post 14 and the second post 46 are elongated along an axis A. The axis A of each of the first post 14 and the second post 46 extends along the vertical axis V. Specifically, the axis A of each of the first post 14 and the second post 46 is parallel with the vertical axis V of the vehicle 10. Each of the first post 14 and the second post 46 extend along the axis A from a bottom end 48 to a top end 50. The bottom end 48 of each of the first post 14 and the second post 46 is connected to the vehicle floor 12. Specifically, the bottom of each of the first post 14 and the second post 46 is fixed relative to the vehicle floor 12. As described further below, the top end 50 of the first post 14 and the second post 46 is moveable relative to the vehicle floor 12. Specifically, the top end 50 is moveable away from the vehicle floor 12 and the bottom end 48. In other words, the first post 14 and the second post 46 are extendable.

The first post 14 and the second post 46 are extendable and retractable along the axis A. Specifically, the first post 14 and the second post 46 are extendable and retractable between the retracted position and the extended position. The first post 14 and the second post 46 are extendable along the axis A between the retracted position and the extended position. As the first post 14 and the second post 46 move to the extended position from the retracted position, the top end 50 moves away from the bottom end 48. As the first post 14 and the second post 46 move to the retracted position from the extended position, the top end 50 moves toward the bottom end 48. Specifically, in the retracted position, each of the posts 14, 46 is elongated a first height H1 and, in the extended position, each of the posts 14, 46 is elongated a second height H2. The second height H2 is larger than the first height H1. In other words, the height of the post 14, 46 is larger in the extended position than in the retracted position.

The first post 14 and the second post 46 may each be telescopic. In other words, the first post 14 and the second post 46 may include a portion 54 that moves relative to another portion 52 to extend the first post 14 and the second post 46 between the retracted position and the extended position. In the example shown in the Figures, each of the first post 14 and the second post 46 includes a base 52 and a member 54 that is moveable relative to the base 52. Specifically, each of the first post 14 and the second post 46 includes a base 52 and a member 54 that is moveable relative to the base 52 along the axis A. The base 52 is stationary relative to the vehicle floor 12 and the member 54 is moveable relative to the base 52 and the vehicle floor 12. Specifically, in the example shown in the Figures, the base 52 is fixed to the vehicle floor 12 and the member 54 moves along the base 52. In other words, the base 52 of the post 14, 46 is stationary relative to the vehicle floor 12. The base 52 includes the bottom end 48 of each of the posts 14, 46 and the base 52 is fixed to the vehicle floor 12 at the bottom end 48. The member 54 is moveable along the base 52 and the axis A to move each of the first post 14 and the second post 46 between the retracted position and the extended position. The member 54 includes the top end 50 of each of the posts 14, 46. As the member 54 moves relative to the base 52, the top end 50 moves away from the base 52 as each of the posts 14, 46 moves to the extended position and the top end 50 moves toward the base 52 as each of the posts 14, 46 moves to the In other words, as each of the posts 14, 46 moves to the extended position, the member 54 moves upwardly along the axis A to the extended position and, as each of the posts 14, 46 moves to the retracted position, the member 54 moves downwardly along the axis A to the retracted position.

Each of the first post 14 and the second post 46 may include a linear actuator (not shown) that is drivably coupled to the member 54 to move the member 54 along the base 52 between the retracted position and the extended position. Each of the linear actuators may move simultaneously such that each of the first post 14 and the second post 46 move simultaneously. In other words, the linear actuators the posts 14, 46 of the base 52 at the same rates. Both the first post 14 and the second post 46 move together to the retracted position and to the extended position. Specifically, when the first post 14 is in the extended position, the second post 46 is in the extended position and, when the first post 14 is in the retracted position, the first post 14 is in the retracted position. Both the first post 14 and the second post 46 move together to each position.

The linear actuator may be any suitable type of linear actuator. In some examples, the linear actuator may include a lead screw extending along the posts 14, 46. The linear actuator may include an electric (not shown) fixed to each of the members 54, e.g., for driving the lead screw or equivalent mechanism. The electric motor may rotate the lead screw to move the members 54 between the retracted position and the extended position. The member 54 may include a carriage that carries the member 54 along the threading of the lead screw to move member 54 relative to the base 52. The threading of the lead screw may be tuned to adjust the rate at which the member 54 moves. In other examples, the linear actuator may be a rack and pinion configuration to move the member 54 relative to the base 52. The linear actuator may include any other suitable mechanism to move the member 54 between the retracted position and the deployed position.

Figure 4A:
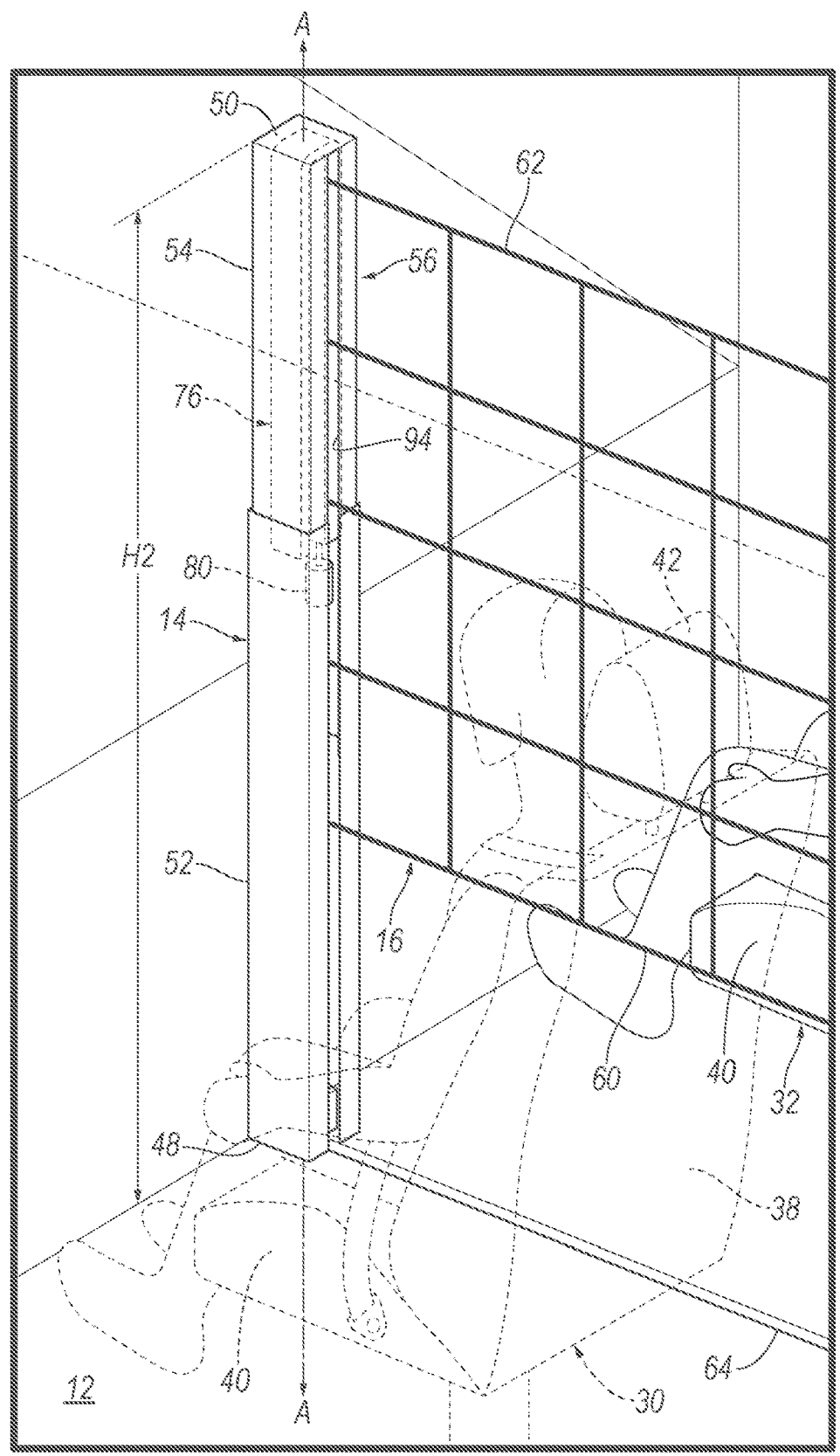
FIG. 4A is a perspective view of the post with the net in the raised position.
Figure 4B:
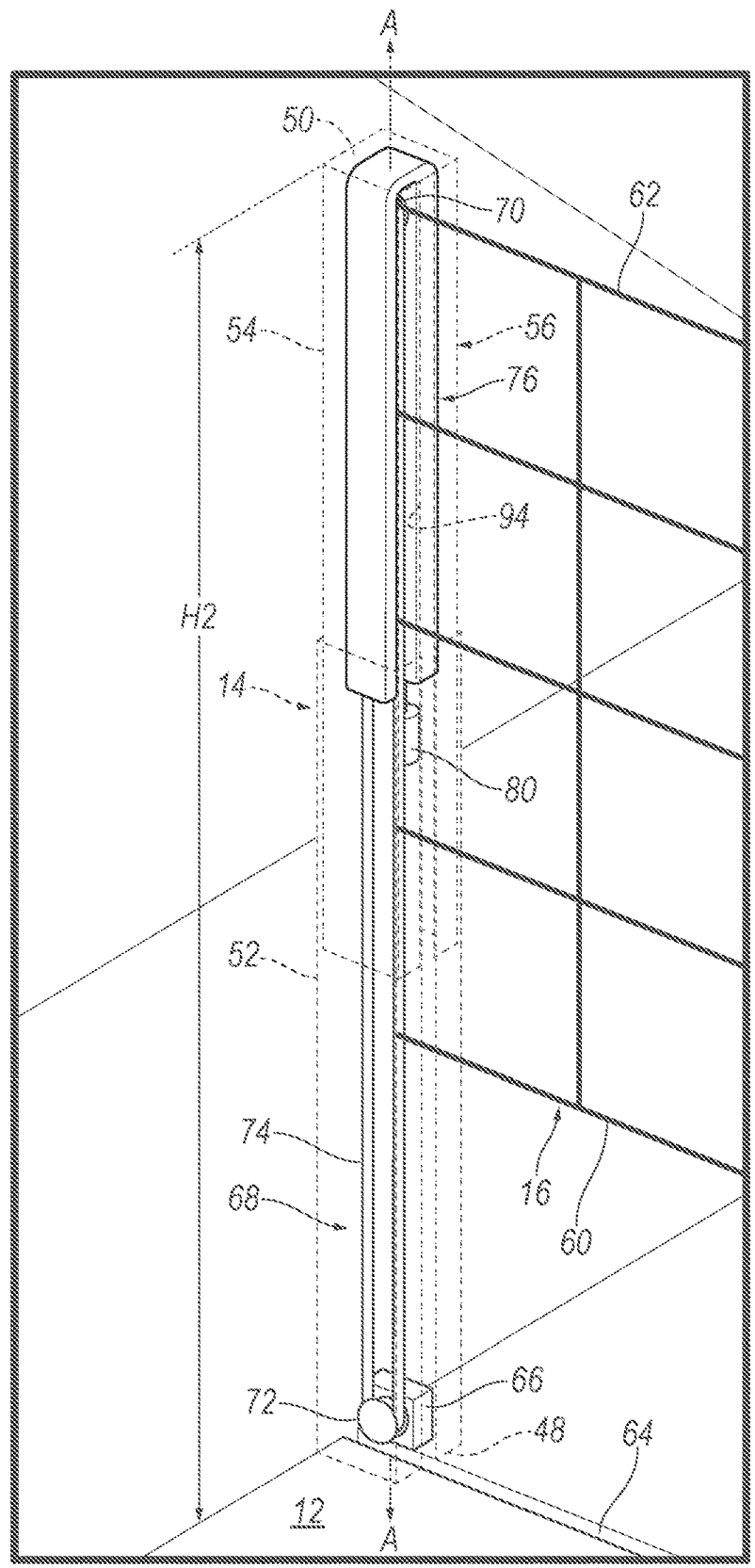
FIG. 4B is a perspective view of the post with the net in the raised position.

With reference to FIGS. 3, 4A, and 4B, the vehicle 10 includes the net 16 between the first post 14 and the second post 46. In other words, the net 16 extends from the first post 14 to the second post 46. The net 16 extends longitudinally in the vehicle 10. Specifically, the net 16 extends along the vehicle-longitudinal axis L from a first end 56 to a second end 58. In other words, the net 16 is elongated from the first end 56 to the second end 58. The first end 56 is engaged with the first post 14 and the second end 58 is engaged with the second post 46. The net 16 extends from a bottom edge 60 to a top edge 62. Each of the top edge 62 and the bottom edge 60 extend from the first end 56 to the second end 58.

The net 16 is moveable from the lowered position and the raised position. Specifically, the net 16 moves between the lowered position and the raised position when the posts 14, 46 are in the extended position. In both the lowered position and the raised position, the net 16 is between the first seat 30 and the second seat 32 and the net 16 is between the third seat 34 and the fourth seat 36 along the cross-vehicle axis C. In other words, the net 16 is between seats 30, 32, 34, 36 that are spaced cross-vehicle from each other. The first seat 30 and third seat 34 are on one side of the net 16 and the second seat 32 and fourth seat 36 are on the other side of the net 16.

When the net 16 is in the lowered position, the net 16 may be below the vehicle floor 12. For example, the vehicle floor 12 may define a slot 64 that extends from the first post 14 to the second post 46 and the net 16 may be in the slot 64 when the net 16 is in the lowered position. The net 16 may be moveable into and out of the slot 64 when the net 16 moves between the lowered position and the raised position. In the raised position, the net 16 is spaced from the vehicle floor 12. Specifically, in the raised position, the net 16 is spaced upwardly from the vehicle floor 12. Both the top edge 62 and the bottom edge 60 are spaced upwardly from the vehicle floor 12 in the raised position. The top edge 62 of the net 16 is adjacent the top end 50 of each of the posts 14, 46 in the raised position. The top edge 62 and the bottom edge 60 are spaced from each other along the posts 14, 46 in the raised position. The bottom edge 60 of the net 16 may be between the top end 50 of each of the posts 14, 46 and the bottom end 48 of each of the posts 14, 46 in the raised position. The net 16 may be, along the cross-vehicle axis C, between the occupant-seating area 44 of the first seat 30 and the occupant seat area of the second seat 32 when the net 16 is in the raised position. Additionally, the net 16 may be, along the cross-vehicle axis C, between the occupant-seating area 44 of the third seat 34 and the occupant-seating area 44 of the fourth seat 36 in the raised position.

The net 16 is moveably engaged with at least one of the first post 14 and the second post 46. In the example shown in the Figures, the net 16 is moveably engaged with both the first post 14 and the second post 46. Specifically, the net 16 is moveable relative to the first post 14 and the second post 46 between the lowered position and the raised position. The net 16 moves along the posts 14, 46 between the lowered position and the raised position. The net 16 may move along the posts 14, 46 between the lowered position and the raised position when the posts 14, 46 are in the extended position. The posts 14, 46 may include a slit 94 elongated along the posts 14, 46. The slit 94 may extend from the bottom end 48 to the top end 50 of the posts 14, 46. The net 16 may move along the slit 94 from the lowered position to the raised position.

Figure 2A:
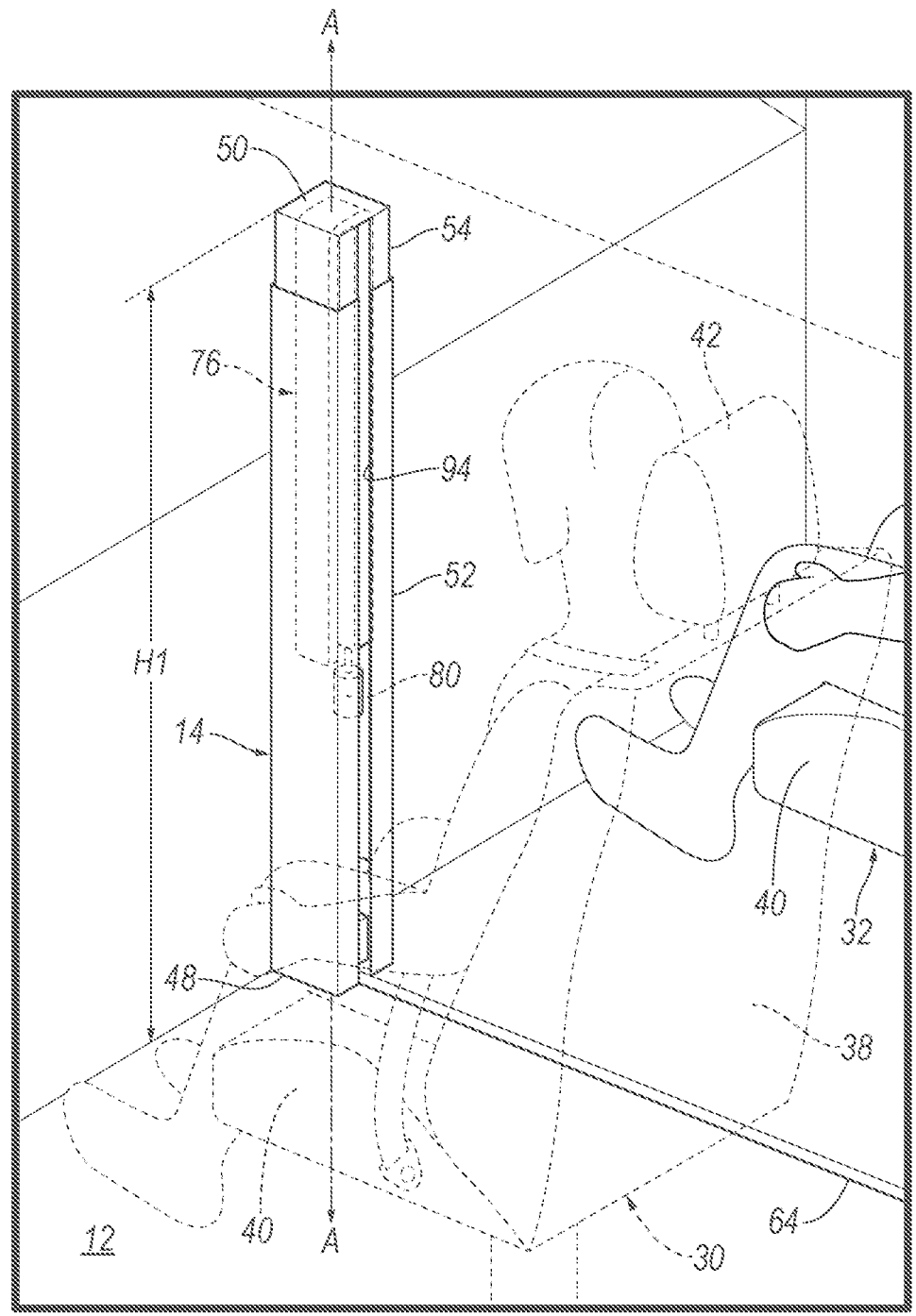
FIG. 2A is a perspective view of a post of the vehicle.
Figure 2B:
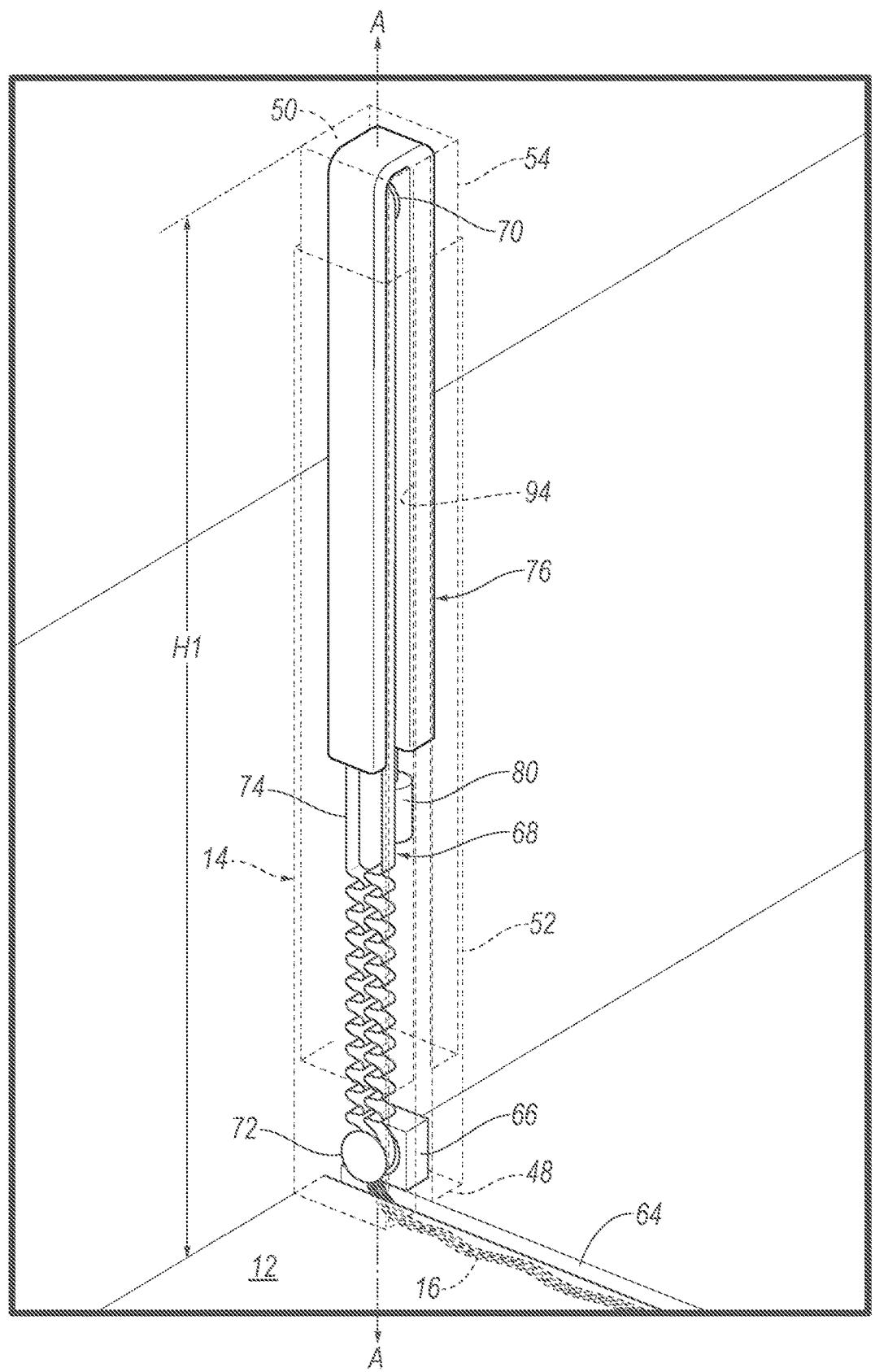
FIG. 2B is a perspective view of the post of the vehicle.

With reference to FIGS. 2B and 4B, a motor 66 may be supported by at least one of the first post 14 and the second post 46 to move the net 16 between the lowered position and the raised position. In the example shown in the Figures, each of the posts 14, 46 includes a motor 66. In other words, the posts 14, 46 bear the weight of the motors 66. The motors are operatively coupled to the net 16 to move the net 16 between the lowered position and the raised position. In the example in the Figures, a pulley system 68 may be coupled to the motor 66 and the net 16 to move the net 16 between the lowered position and the raised position. The pulley system 68 includes a first pulley 70 adjacent the top end 50 of the posts 14, 46, a second pulley 72 adjacent the bottom end of the bottom end of the posts 14, 46, and a belt 74. The belt 74 may be routed around the pulleys. In the lowered position, the belt 74 may have slack between the pulleys. In the raised position, the belt 74 may be taut between the pulleys. To move the net 16 between the lowered position and the raised position, the motor 66 rotates at least one of the pulleys to move the belt 74. When the net 16 reaches the raised position, the motor 66 and/or pulley system 68 may lock to maintain the net 16 in the raised position. The motor 66 and/or pulley system 68 may lock in any suitable way.

Movement of the posts 14, 46 and the net 16 may be dependent on the status of the vehicle 10. For example, the first post 14 and the second post 46 may be in the retracted position and the net 16 may be in the lowered position when the vehicle 10 is powered OFF. In other words, the first post 14 and the second post 46 may be in the retracted position and the net 16 may be in the lowered position in the slot 64 when the vehicle 10 is powered OFF to allow for ingress and egress of the vehicle 10. When the vehicle 10 is powered ON, such as to allow the vehicle 10 to be driven, the first post 14 and the second post 46 may each move from the retracted position to the extended position. Once the first post 14 and the second post 46 are in the extended position, the net 16 may move upwardly along each of the first post 14 and the second post 46 to the raised position. If the vehicle 10 returns to being powered OFF, the net 16 may move from the raised position to the lowered position. Once the net 16 is in the lowered position, the posts 14, 46 move from the extended position to the retracted position.

The vehicle 10 may include one or more airbag assemblies 76 supported by each of the first post 14 and the second post 46. In the example shown in the Figures, an airbag assembly 76 is supported by the first post 14 and an airbag assembly 76 is supported by the second post 46. Specifically, the airbag assemblies 76 are fixed to each of the first post 14 and the second post 46. The airbag assemblies 76 are fixed to the member 54 of each of the first post 14 and the second post 46. The airbag assemblies 76 each includes an airbag, e.g., the first airbag 18 and a second airbag 78, an inflator 80, and may include a housing (not shown). The vehicle 10 may include any suitable number of airbag assemblies 76. As one example, each of the posts 14, 46 of the vehicle 10 may include one airbag assembly 76. In examples including more than one airbag assembly 76, the airbag assemblies 76 may be identical or substantially identical to each other.

As discussed above, in the example shown in the Figures, the airbag assemblies 76 are supported by the first post 14 and the second post 46. Specifically, the first airbag 18 is supported by the first post 14 and the second airbag 78 is supported by the second post 46. As another example, not shown in the Figures, the airbags 18, 78 may be integrated with the net 16, e.g., the net 16 may include the airbags 18, 78. In the example shown in the Figures, the first airbag 18 is supported by the member 54 of the first post 14 and the second airbag 78 is supported by the second post 46. As the posts 14, 46 move from the retracted position to the extended position, the airbags 18, 78 each move upwardly with the member 54. In other words, the airbags 18, 78 are spaced farther from the vehicle floor 12 when the posts 14, 46 are in the extended position than when the posts 14, 46 are in the lowered position.

Each of the airbags 18, 78 is inflatable from an uninflated position to the inflated position in the event of certain vehicle impacts. The airbags 18, 78 are in the uninflated position when the posts 14, 46 are in the retracted position and when the net 16 is in the lowered position. When the posts 14, 46 are in the extended position and the net 16 is in the raised position, the airbags 18, 78 may inflate to the inflated position in the event of certain vehicle impacts. Specifically, each of the airbags 18, 78 inflates along the net 16. In other words, each of the airbags 18, 78 inflates along the vehicle-longitudinal axis L to inflate along the net 16. As discussed further below, the airbags 18, 78 inflate such that the airbags 18, 78 may at least partially surround the net 16 in the inflated position. The posts 14, 46 may include a releasable seam (not shown), e.g., a tear seam, to allow the airbags 18, 78 to inflated to the inflated position.

Each of the airbags 18, 78 inflate away from the respective post supporting the airbag 18, 78. For example, the first airbag 18 inflates away from the first post 14 and the second airbag 78 inflates away from the second post 46. In the example shown in the Figures, the first airbag 18 inflates in a vehicle-rearward direction R, e.g., toward the second post 46, and the second airbag 78 inflates in a vehicle-forward direction F, e.g., toward the first post 14. Specifically, each of the first airbag 18 and the second airbag 78 inflate away from the first post 14 and the second post 46 to an end 82. The end 82 of the first airbag 18 is spaced vehicle-rearward of the first post 14 along the net 16 and the end 82 of the second airbag 78 is spaced vehicle-forward of the second post 46 along the net 16. In other words, the end 82 of the first airbag 18 and the end 82 of the second airbag 78 are between the first post 14 and the second post 46.

Each of the first airbag 18 and the second airbag 78 inflates along the net 16 to surround the net 16 at least partially when in the inflated position. Specifically, each of the airbags 18, 78 includes a pair of side portions 84 spaced from each other and a top portion 86 between the side portions 84. The side portions 84 are on either side of the net 16. In other words, the net 16 is between the side portions 84 when the airbags 18, 78 are in the inflated position. Specifically, the net 16 is between the side portions 84 along the cross-vehicle axis C. The top portion 86 extends around the top edge 62 of the net 16 to connect the side portions 84 to each other. The side portions 84 extend downwardly from the top portion 86 toward the bottom edge 60 of the net 16. Specifically, the side portions 84 extend from the top edge 62 of the net 16 to the bottom edge 60 of the net 16.

Figure 6:
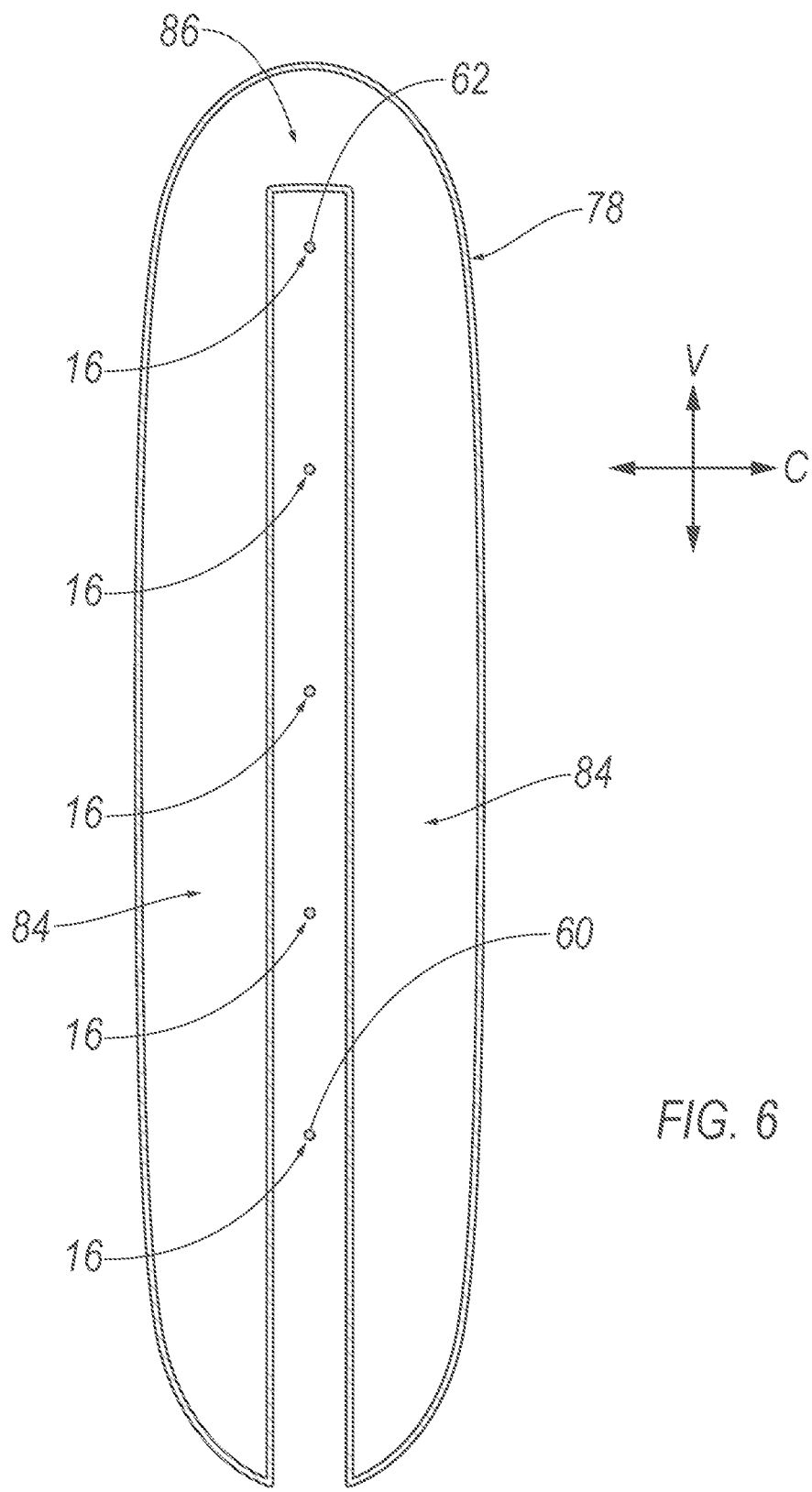
FIG. 6 is a cross-sectional view through one of the airbags.

With continued reference to FIGS. 5 and 6, in the inflated position, the airbags 18, 78 may control the kinematics of occupants of the seats 30, 32, 34, 36. The net 16 may be the reaction surface for the airbags 18, 78 as the airbags 18, 78 control the kinematics of the occupants. In the example shown in the Figures, the first airbag 18 is between the first seat 30 and the second seat 32 along the cross-vehicle axis C and the second airbag 78 is between the third seat 34 and the fourth seat 36 along the cross-vehicle axis C. The first airbag 18 is between the net 16 and the first seat 30 and the first airbag 18 is between the net 16 and the second seat 32. In other words, the first airbag 18 is between the net 16 and the occupant-seating area 44 of first seat 30 and the first airbag 18 is between the net 16 and the occupant-seating area 44 of the second seat 32. The side portions 84 of the first airbag 18 are between the net 16 and the first seat 30 and between the net 16 and the second seat 32. The second airbag 78 is between the net 16 and the third seat 34 and the second airbag 78 is between the net 16 and the fourth seat 36. In other words, the second airbag 78 is between the net 16 and the occupant-seating area 44 of the third seat 34 and the second airbag 78 is between the net 16 and the occupant-seating area 44 of the fourth seat 36. The side portions 84 of the second airbag 78 are between the net 16 and the third seat 34 and between the net 16 and the fourth seat 36.

Each airbag assembly 76 includes an inflator 80. For example, an inflator 80 may be in fluid communication with the first airbag 18 and an inflator 80 may be in fluid communication with the second airbag 78. The inflators 80 are fluidly connected to the airbags 18, 78. The inflators 80 expands the airbags 18, 78 with inflation medium, such as a gas, to move the airbags 18, 78 from the uninflated position to the inflated position. The inflators 80 may be, for example, a pyrotechnic inflator that ignites a chemical reaction to generate the inflation medium, a stored gas inflator that releases (e.g., by a pyrotechnic valve) stored gas as the inflation medium, or a hybrid.

The airbags 18, 78 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 7:
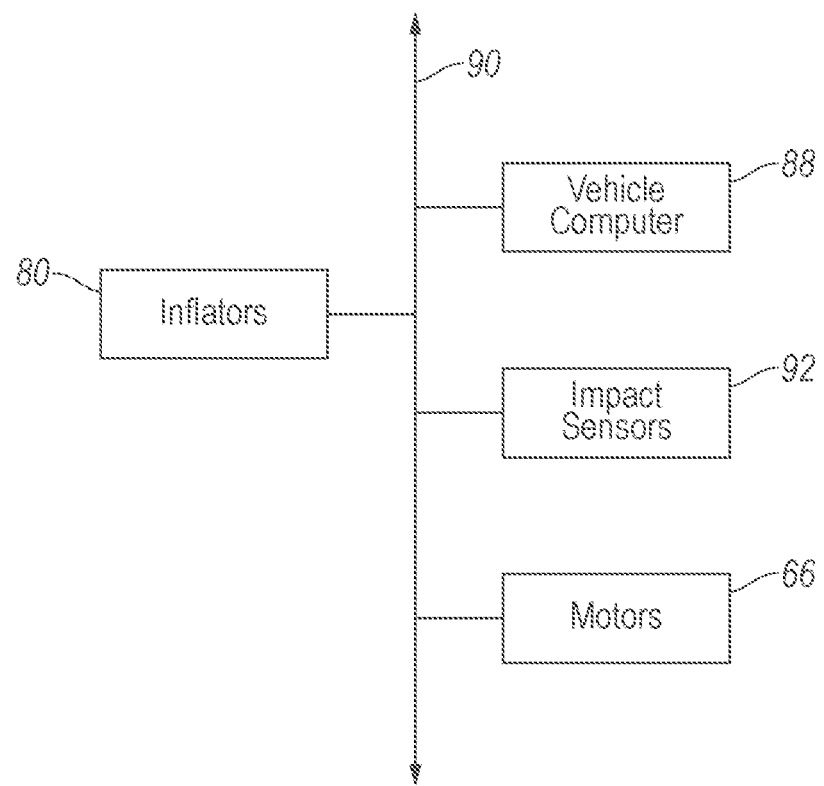
FIG. 7 is a block diagram of a vehicle communication network of the vehicle.

With reference to FIG. 7, the vehicle 10 includes a vehicle computer 88 that includes a processor and a memory storing instructions executable by the processor. The memory includes one or more forms of computer readable media, and stores instructions executable by the vehicle computer 88 for performing various operations, including as disclosed herein. The vehicle computer 88 may be a restraints control module. The vehicle computer 88 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 88 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 88.

The vehicle computer 88 is generally arranged for communications on a vehicle communication network 90 that can include a bus in the vehicle 10 such as a controller area network CAN or the like, and/or other wired and/or wireless mechanisms. Alternatively or additionally, in cases where the vehicle computer 88 actually comprises a plurality of devices, the vehicle communication network 90 may be used for communications between devices represented as the vehicle computer 88 in this disclosure. Further, as mentioned below, various controllers and/or sensors may provide data to the vehicle computer 88 via the vehicle communication network 90.

The vehicle 10 may include at least one impact sensor 92 for sensing certain vehicle impacts (e.g., impacts of a certain magnitude, direction, etc.), and the vehicle computer 88 in communication with the impact sensor 92 and the inflators 80. The vehicle computer 88 may activate the inflators 80, e.g., provide an impulse to a pyrotechnic charge of the inflators 80 when the impact sensor 92 senses certain vehicle impacts. The impact sensor 92 may be configured to sense certain vehicle impacts prior to impact, i.e., pre-impact sensing. The impact sensor 92 may be in communication with the vehicle computer 88. The impact sensor 92 is configured to detect certain vehicle impacts. In other words, a "certain vehicle impact" is an impact of the type and/or magnitude for which the airbag is designed to inflate, i.e., "certain" indicates the type and/or magnitude of the impact. The type and/or magnitude of such "certain vehicle impacts" may be prestored in the vehicle computer 88, e.g., a restraints control module and/or a body control module. The impact sensor 92 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 92 may be located at numerous points in or on the vehicle 10.

Figure 8:
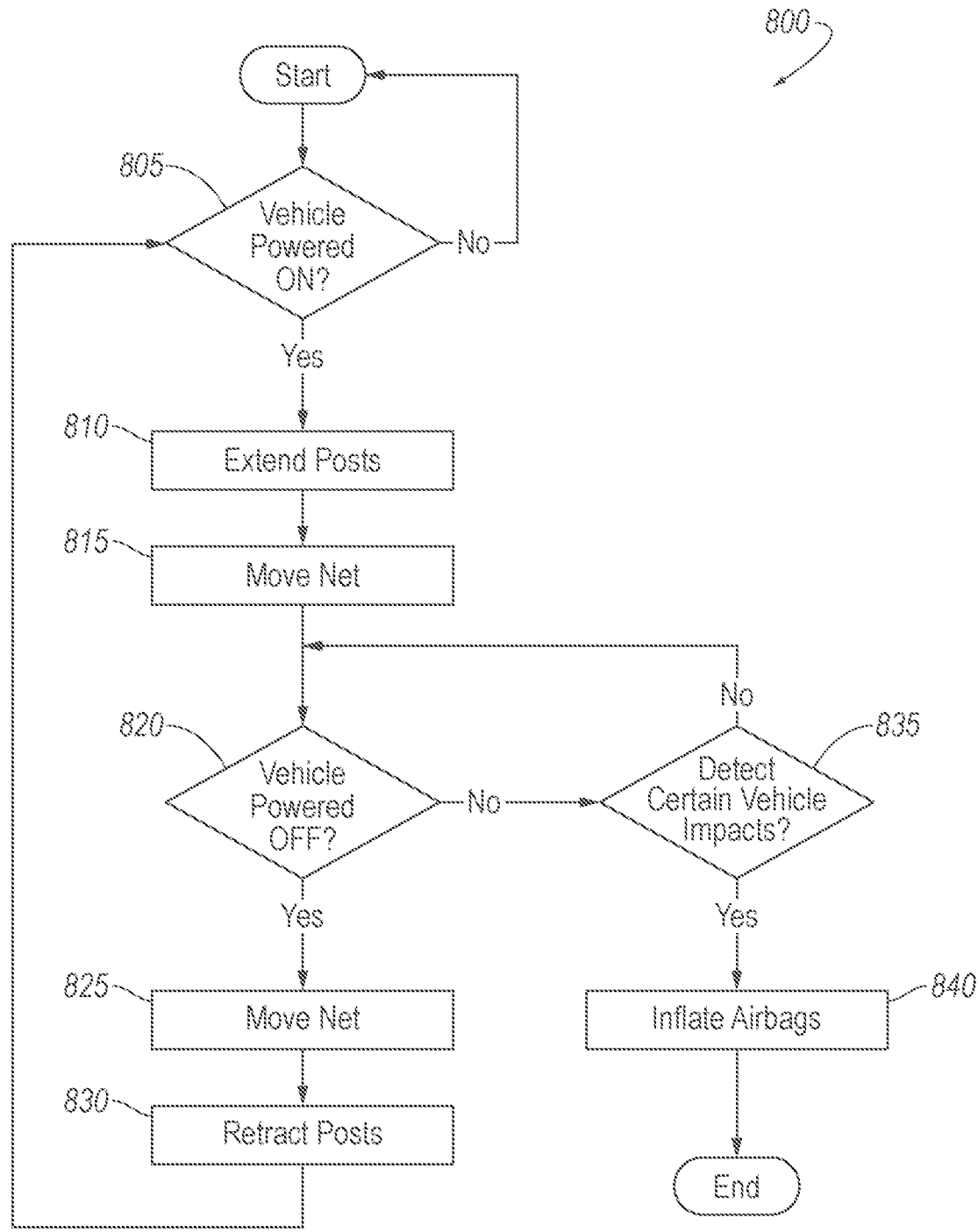
FIG. 8 is a flowchart of an example method executable by a vehicle computer.

With reference to FIG. 8, the vehicle computer 88 stores instructions to control components of the vehicle 10 according to the method 800. Specifically, the vehicle computer 88 may control movement of the posts 14, 46, net 16, and inflation of the airbags 18, 78 based on certain vehicle impacts. Use of "in response to," "based on," and "upon determining" herein, including with reference to method 800, indicates a causal relationship, not merely a temporal relationship.

With reference to decision block 805, the method 800 includes identifying the vehicle 10 is powered ON. A signal may be sent to the vehicle computer 88 indicating that the vehicle 10 is powered ON. For example, the vehicle 10 may be powered ON when an occupant plans the vehicle 10 to be in motion. Powering the vehicle 10 ON may include ignition of a combustion engine or activating battery power in electric vehicles. If the vehicle 10 is not identified as being powered ON, the method 800 returns to start. If the vehicle 10 is identified as being powered ON, the method 800 continues to block 810.

With reference to block 810, based on identification that the vehicle 10 is powered ON, the method 800 includes extending the posts 14, 46 from the retracted position to the extended position. The vehicle computer 88 may send a signal to the posts 14, 46, e.g., the linear actuator, to move the posts 14, 46 from the retracted position to the extended position.

With reference to block 815, the method 800 includes moving the net 16 from the lowered position to the raised position. The vehicle computer 88 may send a signal to the motor 66 to rotate the pulley system 68 that moves the net 16 from the lowered position to the raised position. The net 16 will move upwardly from the slot 64 of the vehicle floor 12 into the raised position.

With reference to decision block 820, the method 800 includes identifying this vehicle 10 is powered OFF. A signal may be sent to the vehicle computer 88 indicating the vehicle 10 is powered OFF. For example, the vehicle 10 may be powered OFF when the vehicle 10 has reached a desired destination and the vehicle 10 has been parked. Powering the vehicle 10 OFF may include powering OFF the ignition of a combustion engine or deactivating battery power in electric vehicles. If the vehicle 10 is identified as being powered OFF, the method 800 continues to block 825. If the vehicle 10 is not identified as being powered OFF, the method 800 continues to block 835.

With reference to block 825, the method 800 includes moving the net 16 from the raised position to the lowered position. The vehicle computer 88 may send a signal to the motor 66 to rotate the pulley system 68 that moves the net 16 from the raised position to the lowered position. The net 16 will move downwardly to the slot 64 of the vehicle floor 12 into the lowered position.

With reference to block 830, based on identification that the vehicle 10 is powered OFF, the method 800 includes retracting the posts 14, 46 from the extended position to the retracted position. The vehicle computer 88 may send a signal to the posts 14, 46, e.g., the linear actuator, to move the posts 14, 46 from the extended position to the retracted position.

With reference to decision block 835, in response to lack of identifying the vehicle 10 is powered OFF, the method 800 includes detecting certain vehicle impacts. The impact sensors 92 may detect the certain vehicle impacts and send a signal to the vehicle computer 88 indicating the certain vehicle impacts.

With reference to block 840, in response to detection of certain vehicle impacts, the method 800 includes inflating the airbags 18, 78 to the inflated position. The vehicle computer 88 may send a signal to the inflators to inflate the airbags 18, 78 to the inflated position. The airbags 18, 78 may control the kinematics of the occupants of the seats 30, 32, 34, 36.

The disclosure has been described in an illustrative manner, and it is to be understood that the terminology which has been used is intended to be in the nature of words of description rather than of limitation. The numerical adjectives "first," "second," "third," and "fourth" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
a vehicle floor;
a post being extendable relative to the vehicle floor from a retracted position to an extended position;
a net moveably engaged with the post, the net being moveable relative to the post between a lowered position and a raised position; and
an airbag supported on the post and being inflatable to an inflated position when the post is in the extended position and the net is in the raised position.

2. The vehicle of claim 1, further comprising a computer including a processor and a memory storing instructions executable by the processor to:
identify the vehicle is powered ON;
based on identification that the vehicle is powered ON, extend the post from the retracted position to the extended position; and
move the net from the lowered position to the raised position.

3. The vehicle of claim 2, wherein the instructions include instructions to:
identify the vehicle is powered OFF;
based on identification that the vehicle is powered OFF, move the net from the raised position to the lowered position; and
retract the post from the extended position to the retracted position.

4. The vehicle of claim 2, wherein the instructions include instructions to:
detect certain vehicle impacts; and
inflate the airbag to the inflated position.

5. The vehicle of claim 1, wherein the post includes a base and a member moveable relative to the base as the post moves to the extended position.

6. The vehicle of claim 5, wherein the airbag is supported by the member of the post.

7. The vehicle of claim 5, wherein the post is elongated along an axis, the member of the post being moveable relative to the base along the axis.

8. The vehicle of claim 1, wherein the net is spaced upwardly from the vehicle floor when the net is in the raised position and the post is in the extended position.

9. The vehicle of claim 1, further comprising a first seat and a second seat spaced cross-vehicle from the first seat, the net being between the first seat and the second seat.

10. The vehicle of claim 9, wherein the airbag is between the first seat and the net when the airbag is in the inflated position and the airbag is between the second seat and the net when the airbag is in the inflated position.

11. The vehicle of claim 1, wherein the airbag includes a pair of side portions spaced from each other and a top portion between the side portions, the net being between the side portions in the inflated position.

12. The vehicle of claim 1, wherein the airbag inflates away from the post to an end spaced from the post in the inflated position.

13. The vehicle of claim 1, further comprising:
a second post being extendable relative to the vehicle floor from a retracted position to an extended position, the second post being spaced along a vehicle-longitudinal axis from the post; and
a second airbag supported on the second post and being inflatable to an inflated position when the second post is in the extended position and the net is in the raised position;

the net being moveably engaged with the second post, the net being moveable relative to the second post between the lowered position and the raised position.

14. The vehicle of claim 13, wherein the airbag inflates in a vehicle-rearward direction and the second airbag inflates in a vehicle-forward direction.

15. The vehicle of claim 13, wherein the vehicle floor defines a slot extending from the post to the second post, the net being in the slot when the net is in the lowered position.

16. The vehicle of claim 15, wherein the net is spaced from the slot when the net is in the raised position.

17. The vehicle of claim 13, further comprising a first seat and a second seat spaced along the vehicle-longitudinal axis from the first seat, the airbag being between the net and the first seat in the inflated position and the second airbag being between the net and the second seat in the inflated position.

18. The vehicle of claim 1, wherein the net includes a top edge and a bottom edge spaced along the post from the top edge, the airbag extending from the top edge toward the bottom edge.

19. The vehicle of claim 1, further comprising a motor supported by the post and operatively coupled to the net to move the net from the lowered position to the raised position.

* * * * *